United States Patent [19]

Inoue et al.

[11] Patent Number: 4,598,189
[45] Date of Patent: Jul. 1, 1986

[54] AUTOMATIC WIRE-THREADING WITH A TUBULAR ELECTRODE IN A TW-E MACHINE

[75] Inventors: Kiyoshi Inoue, Tokyo; Makoto Onoue; Sadao Sano, both of Yokohama, all of Japan

[73] Assignee: Inoue-Japax Research Incorporated, Kanagawa, Japan

[21] Appl. No.: 708,226

[22] Filed: Mar. 5, 1985

[30] Foreign Application Priority Data

| Mar. 28, 1984 | [JP] | Japan | 59-58333 |
| Mar. 28, 1984 | [JP] | Japan | 59-58334 |
| Apr. 13, 1984 | [JP] | Japan | 59-73050 |
| May 2, 1984 | [JP] | Japan | 59-87714 |
| May 2, 1984 | [JP] | Japan | 59-87715 |

[51] Int. Cl.⁴ .............................................. B23H 7/02
[52] U.S. Cl. ................................ 219/69 W; 204/206; 219/69 M
[58] Field of Search ............... 219/69 M, 69 W, 69 E; 204/206

[56] References Cited

U.S. PATENT DOCUMENTS

| 3,822,374 | 7/1974 | Ullmann et al. | 219/69 W |
| 3,891,819 | 6/1975 | Ullmann et al. | 219/69 M |
| 3,987,270 | 10/1976 | Ullmann et al. | 219/69 W |
| 4,367,392 | 1/1983 | Girardin | 219/69 W |
| 4,431,894 | 2/1984 | Inoue | 219/69 W |

FOREIGN PATENT DOCUMENTS

| 56-89436 | 7/1981 | Japan | 219/69 W |
| 119327 | 9/1981 | Japan | 219/69 M |
| 149126 | 9/1982 | Japan | 219/69 W |
| 58-51018 | 3/1983 | Japan | 219/69 M |
| 149133 | 9/1983 | Japan | 219/69 W |
| 82/01339 | 4/1982 | PCT Int'l Appl. | 219/69 W |
| 1009684 | 4/1983 | U.S.S.R. | 219/69 W |

*Primary Examiner*—Clarence L. Albritton
*Assistant Examiner*—Geoffrey S. Evans
*Attorney, Agent, or Firm*—Karl F. Ross; Herbert Dubno

[57] ABSTRACT

AT (automatic threading) of wire through a workpiece without the need for a preformed through-hole therein is achieved on a TW (traveling-wire) electroerosion machine (TW-E machine) by utilizing a tubular electroerosion electrode positioned in axial alignment with a wire-threading path. Wire from a wire supply is introduced into the tubular electrode so as to extend through a tool holder therefor. The tubular electrode is advanced along the wire-threading path into and through the workpiece while electroerosively forming a bore therein. Wire is dispensed from the supply to allow wire to move out of the tubular electrode while the latter at least partially remains in the bore so that the wire passes into the wire outlet side of the cutting zone towards a takeup assembly. The tubular electrode may then be retracted along the wire-threading path from the workpiece while leaving wire in the bore finished in the workpiece.

54 Claims, 9 Drawing Figures

AUTOMATIC WIRE-THREADING WITH A TUBULAR ELECTRODE IN A TW-E MACHINE

FIELD OF THE INVENTION

The present invention relates to traveling-wire (TW) electroerosion and, more particularly, to an improved method of threading electrode wire through a conductive workpiece in a TW electroerosion machine (TW-E machine) as well as an improved TW machine with the ability to perform the automatic threading (AT) of wire in a unique mode. The term "electroerosion used as herein is intended to refer broadly to the process of electrical machining in general, including electrical discharge machining (EDM), electro-chemical machining (ECM) and electrochemical-discharge machining (ECDM). The term "electrode wire" or "wire" used herein is intended primarily to refer to an elongated electrode in the form of a thin continuous wire, but may include any other similar form of elongated electroerosion electrode such as one of tape form.

BACKGROUND OF THE INVENTION

In a TW electroerosion machine, a continuous electrode wire feeds continuously from a supply means to a takeup means and is axially transported along a continuous path of wire travel established between them. Guide means are commonly disposed at the opposite sides of the workpiece to define a straight-line path across a cutting zone and to maintain wire travel in alignment therewith and in machining relationship with the workpiece in the cutting zone. A power supply is provided for passing an electrical machining current, typically in the form of a succession of pulses, between the electrode wire and the workpiece across a machining gap flooded with a machining liquid, e.g. water, to electroerosively remove material from the workpiece. As the process proceeds, the workpiece is displaced transversely relative to the axis of electrode wire along a prescribed feed path under the command, preferably, of a numerical-control (NC) unit, so that a desired cut is formed in the workpiece.

A TW electroerosion machine is generally required to machine a number of cuts or contours in a workpiece or workpieces in a sequence of separate TW operations, each cut or contour most often starting inside the workpiece. This requires the workpiece to be "threaded" with the wire at a start position associated with a cut or contour desired in any such subsequent TW operation. To this end, it has so far been the common belief that the workpiece must have a preformed through-hole at such a start position for accepting the wire and permitting it to extend therethrough in the established continuous path on the machine. It is also desirable that threading be done automatically without the need for manual handling by the operator. Thus, the workpiece has been positioned or repositioned on the machine to align the preformed through-hole with the established straight-line path so that wire can thereafter be threaded automatically by propelling it into, through and out beyond the preformed starting through-hole along that path which must, of course, be unencumbered (see, e.g. U.S. Pat. No. 3,891,819). With the known automatic threading arrangements according to the conventional concept, difficulties arise due to the extreme thinness of the wire (i.e. the wire is normally less than 0.4 mm in diameter or thickness) and its consequent poor self-supporting ability yet coupled with its inherent elastic characteristic. It has been found that very often wire is deflected prior to entry into the small preformed through-hole or otherwise is caught on a wall portion of the through-hole or elsewhere in the threading path necessarily constituted by various discrete guide elements. As a result, it has been the common belief that the chances of having wire to be successfully threaded on a TW machine even highly sophisticated are at most 90% and mostly much less. We have now found that the need for a preformed through-hole can be drastically limited to provide highly efficient automatic threading (AT) and TW operations and that the conventional threading difficulties in the TW electroerosion system can be effectively overcome by eliminating this need, according to the principles of the invention to be described hereinafter.

OBJECTS OF THE INVENTION

The present invention therefore seeks to provide a novel and improved method of threading electrode wire through a workpiece in a TW electroerosion machine whereby threading can be achieved automatically and practically without fail (or with chances of success more than 99%) while eliminating the need for a preformed through-hole.

The present invention also seeks to provide a novel and improved TW electroerosion with a highly efficient and reliable AT ability which are afforded in a relatively simplified arrangement.

SUMMARY OF THE INVENTION

In accordance with the present invention there is provided, in a first aspect thereof, a method of threading electrode wire through a conductive workpiece in a traveling-wire electroerosion machine having a cutting zone established in a predetermined continuous path of wire travel between a wire supply means and a wire takeup means, which method comprises: (a) positioning a tubular electroerosion electrode axially in alignment substantially with a straight-line wire-threading path extending across the cutting zone in the continuous path; (b) introducing wire from the supply means into the tubular electroerosion electrode at a wire inlet side of the cutting zone: (c) positioning the workpiece to locate a start position for traveling-wire electroerosion therein substantially in alignment with the straight-line path in the cutting zone; (d) axially advancing the tubular electrode substantially along the wire-threading path into and through the workpiece while electroeroding the workpiece to form a bore penetrating the workpiece between the wire-inlet side and a wire-outlet side of the cutting zone at said start position; (e) retracting the tubular electroerosion electrode substantially along the straight-line path from the workpiece while leaving wire at least partially in the bore finished in the workpiece; and (f) dispensing electrode wire from the supply means to allow wire to move out of the tubular electrode, while the latter at least partially remains in the bore, into the wire outlet side towards the takeup means in the continuous path.

The invention also provides in a second aspect thereof a traveling-wire electroerosion machine with an automatic wire-threading function, having a wire-supply means, a wire-takeup means and a cutting zone established in a predetermined continuous path of wire travel between them, and a straight-line wire-threading path extending across the cutting zone in the continuous path, which machine comprises: means for supporting a conductive workpiece so that an established start position therein of traveling-wire electroerosion lies substantially in alignment with the straight-line path: a tool holder for accepting a tubular electroerosion electrode and supporting it substantially in axial alignment with the straight-line wire-threading path while permitting the tubular electrode to accommodate therein an electrode wire extending through the tool holder; guide means for introducing the wire dispensed from said supply means into said tubular electrode at a wire-inlet side of the cutting zone; drive means associated with said tool holder for axially advancing the tubular electrode substantially along the straight-line wire-threading path into and through the workpiece while electroeroding the workpiece to form a bore penetrating the workpiece between the wire-inlet side and a wire-outlet side of the cutting zone, and thereafter retracting the tubular electrode from the workpiece while leaving wire at least partially in the bore finished therein: and wire-dispensing means operable in conjunction with the drive means for dispensing wire from the supply means to axially drive wire introduced to move out of the tubular electrode while the latter remains at least partially in the finished bore, into the wire-outlet side towards takeup means in the continuous path.

BRIEF DESCRIPTION OF THE DRAWING

These and other concomitant objects and features of the present invention as well as advantages thereof will become more readily apparent from the following description of certain preferred embodiments thereof, given by way of example only, when taken with reference to the accompanying diagrammatic drawings in which.

SPECIFIC DESCRIPTION

Figures 1, 2:
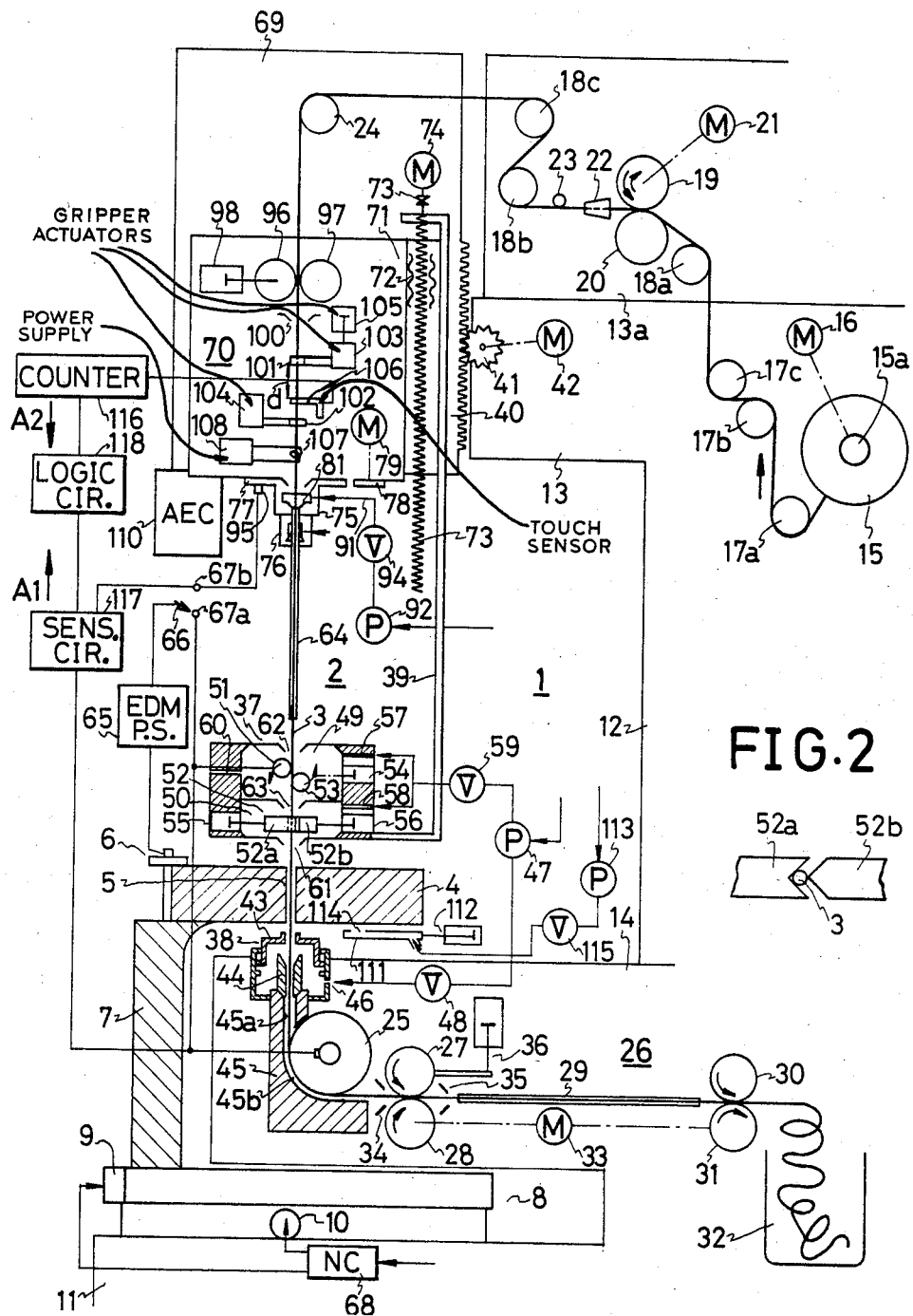
FIG. 1 is schematic view, essentially in elevation and partly in section, illustrating a TW machine constructed and arranged according to the present invention.
FIG. 2 is a schematic cross-sectional view, as viewed from top, of a portion of the arrangement of FIG. 1.

Referring now to FIG. 1, there is shown a TW electroerosion machine 1 with an automatic wire-threading system 3 arranged in a certain preferred form.

The arrangement shown illustrates the state of the machine in which electrode wire 3 has been threaded through an electrically conductive workpiece 4 and is just commencing a TW electroerosion operation to cut a programmed contour starting with a bore 5 therein, the bore 5 having been formed concurrently with the threading of wire 3 as will be described. The wire has a diameter or thickness of 0.05 to 0.5 mm and typically not greater than 0.4 mm.

The workpiece 4 is securely mounted by means of a conductive clamp 6 on a workstand 7 which is in turn securely mounted on a compound cross-table 8 movable in a horizontal X-Y plane by an X-axis and a Y-axis motor 9 and 10 on a base 11 of the machine 1. The frame of the machine 1 comprises a column 12 standing upright on the base 11. From the column 12 there horizontally extend an upper arm 13 and a lower arm 14 in parallel to each other. Electrode wire 3, say, of a diameter of 0.2 mm and composed of, e.g. brass, is supplied from a wire-storage reel 15 detachably fitted on a rotary shaft 15a which is rotatably mounted on the column 12 and rotated by a torque motor 16 to allow the wire to be smoothly dispensed from the reel 15. Wire 3 extends over guide rollers 17a, 17b and 17c on the column 12. The wire is then led over a guide roller 18a, between tension rollers 19, 20 and over guide rollers 18b and 18c on a vertical board 13a mounted on the upper arm 13. The roller 19 is driven by a DC motor 21 and the roller 20 is held pressed against the roller 19 via the wire to constitute a wire tension unit together with the guide rollers 18b and 18c. Between the tension rollers 19, 20 and the guide roller 18b there are disposed a horizontal wire-guide tube 22 and a sensor 23 whose functions are to be described later.

Wire 3 passing through the above tension unit turns over a guide roller 24 on a head member 69 to extend downwards into and through the workpiece 4 and turns over a wire-energizing and guide roller 25 thence to extend horizontally through a wire-takeup system 26 which comprises a pair of wire-traction rollers 27, 28, an elongate tubular guide 29 and a pair of discharge rollers 30, 31, eventually for disposal in a collection box 32. The roller 28 is driven by a DC motor 33 and the roller 27 is pressed against the driven roller 28 via wire 3 to apply a forward traction to the continuous wire to axially drive it along the continuous path between the wire-supply 15 and the wire-takeup unit 26 and along a straight-line path established therein between the rollers 24 and 25 across a TW-cutting zone in the workpiece 4. The tension roller 19 at the wire-supply side is driven by the motor 21 to rotate counterclockwise as shown to produce with the roller 20 a rearward traction or braking force in the wire so that wire 3 travels tensely stretched in alignment with the straight-line path under the traction exerted by the driven rollers 27 and 28. The discharge guides 30 and 31 are driven jointly with the roller 27 by the motor 33 to pull the wire through the tubular guide 29 and discharge it into the collection box 32. Further opening guide members 34 and 35, which are forwardly convergent, are disposed between the roller 25 and the rollers 27, 28 and between the latter and the tubular guide 29, respectively, to allow the free end of the wire 3 turning over the energizing roller 25 to be led without fail into the traction rollers 27, 28 and the pulling rollers 30, 31, respectively in a threading operation to be described. In such an operation, the roller 27 in the takeup unit 26 may be slightly lifted by a hydraulic or pneumatic drive 36 to facilitate entry of the wire end into the takeup unit 26.

Above and below the workpiece 4 there are shown disposed adjacent thereto housings 37 and 38 which are traversed by the electrode wire 3 traveling along the aforesaid straight line path and may be coaxial therewith. The lower housing 38 is supported in or on the end of the arm 14 while the upper housing 37 is supported by a vertical member 39 which is secured to the head member 69. The latter has a rack 40 in mesh with a pinion 41 rotatably mounted on the end of the upper arm 13. The pinion 41 is rotated by a motor 42 to move the head member 69 and the vertical carriage 39 up and down and to vertically position the housing 37 adjacent the upper surface of the workpiece 4.

The lower housing 38 in the illustrated arrangement has a "floating nozzle" 43 slidably fitted therein so as to project towards the workpiece 4 by a limited extend under the fluid pressure in the housing 38. A precision "die" guide member 44 with an annular diamond "die" guide element (not shown) fitted therein is accommodated in the housing 38 to slidably accept wire 3 moving into the nozzle 43. The guide member 44 is supported on a bored guide block 45 fitted into the housing 38 in the arm member 14. The floating nozzle 43 is coaxial with the guide opening of the guide member 44 which is in turn coaxial with the bore 45a of the guide block 45 which has a curved inner surface 45b continuous therewith to provide along with the guide roller 25 a narrow, arcuate passage through which the wire 3 moving from the bore emerges to be led via the convergent guide 34 into the traction rollers 27 and 28. A machining fluid (e.g. deionized water in EDM) is supplied under an elevated pressure (e.g. 6 to 8 kg./cm$^2$) into the housing 38 through a fluid inlet 46 by a pump 47 from a source (not shown) and directed upwards into the cutting zone of the workpiece 4 through the floating nozzle 43. A valve unit 48 is set to adjust the pressure and rate of flow of the machining fluid flushing into the cutting zone. The machining fluid in part diverts within, and in part downwards out of, the housing 38 to serve to cool the guide member 44, guide block 45 and energizing/-guide roller 25 and also wire 3 moving through the passages formed thereby.

The upper housing 37 has two separate compartments 49 and 50 which accommodate an upper wire-energizing unit 51 and an upper precision guide unit 52, respectively. The wire-energizing unit 51 comprises a conductive pin shown in engagement with wire 3. The energizing pin 51 is mechanically coupled with a wire-supporting pin 53 shown also in engagement with the wire. The pins 51 and 53 are jointly displaced by a hydraulic or pneumatic drive 54 to lie both in engagement with the wire 3 during a TW operation and to lie both spaced from the aforesaid straight-line path into predetermined positions during an automatic threading (AT) operation to be described. The precision guide unit 52 comprises two generally complementary guide segments 52a and 52b which are formed with a V-shaped notch and a V-shaped projection, respectively, to accept electrode wire 3 therebetween as shown in FIG. 2. They are displaced by hydraulic or pneumatic drives 55 and 56, respectively, to lie in engagement with the wire 3 in the TW operation and to lie spaced from the aforesaid straight-line path into predetermined positions during the AT operation to be described. The two compartments 49 and 50 have respective fluid inlets 57 and 58 which communicate via a valve unit 59 with the pump 47. The first compartment 49 is filled with the machining fluid as a coolant introduced through the inlet 57 to cool the energizing and supporting pins 51 and 53 and discharged through an outlet port 60. The machining fluid is pumped through the inlet 58 into the second compartment 50 under a moderate pressure (e.g. around 1 kg/cm$^2$) and directed downwards into the cutting zone of the workpiece 4 through a nozzle 61 formed at the lower end of the housing 37 and disposed adjacent the upper surface of the workpiece 4. Wire 3 enters into the upper compartment 49 through a forwardly convergent inlet opening 62 and, moving through a passage 63 between the compartments 49 and 50, passes out of the nozzle 61 which is likewise convergent, into the cutting zone. The inlet opening 62, the passage 63 and the outlet nozzle 61, which are coaxial with each other and axially in alignment with the aforementioned straight-line path, are each of a size sufficient to accept therethrough a tubular electroerosion electrode 64 to be described. Preferably, the inlet opening 62 (and the passage 63) should be narrow enough so that the tubular electrode 64 may be slidably moved therethrough. The opening of the nozzle 61 is sized so as to provide around the tubular electrode 64 advancing into the workpiece 4 an annular spacing through which the machining fluid may be flushed out of the compartment 50 in the AT operation as will be described.

An electroerosion (e.g. EDM) power supply 65 is shown having one terminal (normally positive) connected to the conductive clamp 6 to energize the workpiece 4 and the other terminal (normally negative) connectable via an arm 66 and a first contact 67a on the one hand to the conductive pin 51 to energize electrode wire 3 above the workpiece 4 and on the other hand to the conductive guide roller 25 to energize the wire below the workpiece 4. An electroerosion current is thus passed between the traveling wire 3 and the workpiece 4 across the machining gap flushed with the machining fluid to remove stock from the workpiece 4. An NC unit 68 operates to furnish the motors 9 and 10 with drive pulses to displace along a programmed path the workpiece 4 relative to the electrode wire 30 traveling precision-guided between the upper and lower guide units 52 and 44. The workpiece 4 is thus electroerosively cut with a contour corresponding to the programmed path of relative displacement.

Before a TW operation as described for machining a programmed contour in a workpiece 4 and between successive TW operations for machining separate contours in the workpiece or workpieces, wire 3 must be threaded through the workpiece at a predetermined start position of the contour to be cut therein. To enable the AT operation to be achieved efficiently and without fail, the arrangement 2 shown incorporates an assembly 70 which, in accordance with the principles of the invention, eliminates the need for a preformed starting bore in the workpiece 4.

The assembly 70 is supported on a vertical carriage 71 which has a vertical nut 72 secured thereto. The nut 72 is in mesh with a lead screw 73 rotatably secured to the head member 69. The lead screw 73 is driven by a stepping motor 74 to vertically move the carriage 71 and hence the assembly 70 up and down. The assembly 70 has at its lower end a tool holder 75 with a chuck unit 76 accepting the tubular electrode 64 securely therein. A cylindrical tubular electrode 64 has an outer diamter of 0.5 to 2 mm and an inner diameter such that wire 3 may be guided and advanced therethrough without axial dislocation. For example, the tubular electrode 64 may have an outer diameter of 1 mm and an inner diameter of 0.3 mm for wire 3 of 0.2 mm diameter. Preferably, the inner and outer diameters of the cylindrical tubular electrode 64 should have a ratio of $\frac{1}{4}$ to $\frac{1}{2}$. The ratio of the diameter of wire 3 to the inner diameter of the electrode 64 is preferably between 0.5 to 0.9.

Figure 4:
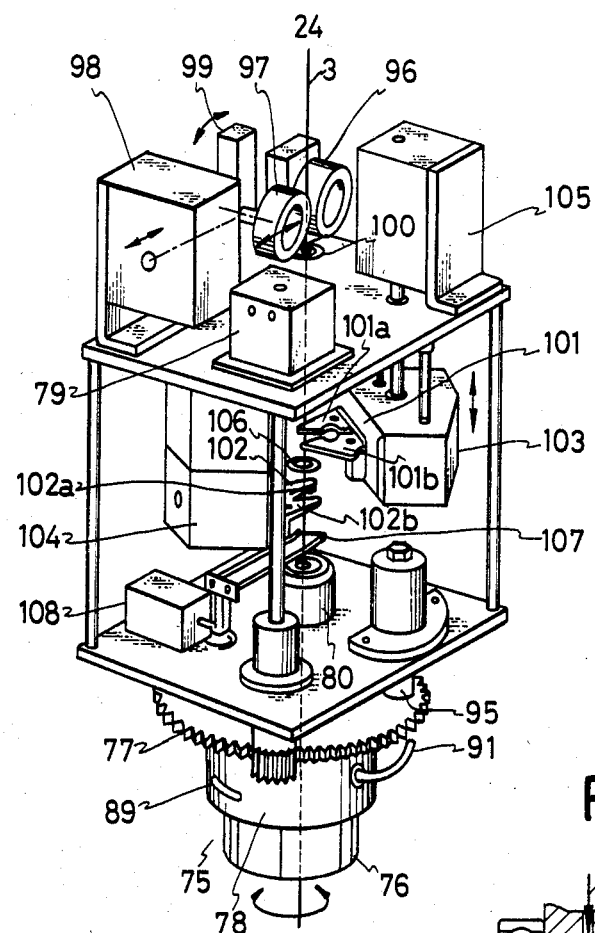
FIG. 4 is a schematic perspective view of a further portion of the AT assembly in the arrangement of FIG. 1.
Figure 3:
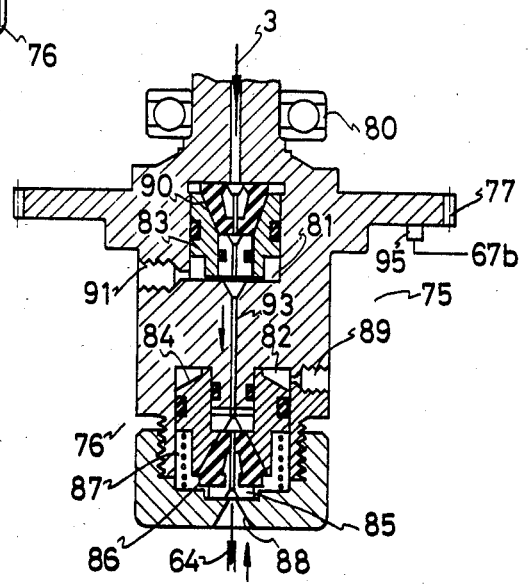
FIG. 3 is a schematic sectional view in elevation of a portion of the AT assembly in the arrangement of FIG. 1.

The tool holder 75 has a geared flange 77 in mesh with a pinion 78 driven by a DC motor 79 and is rotatably journaled in a bearing 80 as shown in FIGS. 3 and 4. Referring to FIG. 3, the tool holder 75 has two chambers 81 and 82 accommodating centrally bored, vertically movable piston members 83 and 84, respectively. The member 84 with a tapered shoulder is seated on a four-segment chuck 85 via centrally a bored rubber fitting 86 and movably supported on a spring 87. The tubular electrode 64 is inserted through an upwardly convergent, central opening 88 into the chuck 85. A pressure fluid is introduced through an inlet 89 into a space defined by the walls of the chamber 82 and the shoulder of the piston 84 to urge the latter slidably downwards to compress the elastic fitting 86, thereby maintaining the inserted tubular electrode 64 firmly clamped with the segmented chuck 85. The upper chamber 83 is provided to supply a pressurized machining fluid, preferably a deionized water fluid, into the clamped tubular electrode 64 and to allow it to be discharged therethrough. The piston 83 is slidably retained in the chamber 83 to be movable vertically therein and accepts a rubber fitting 90. As the machining fluid is introduced through an inlet 91 by a pump 92 (FIG. 1), the piston 83 is slightly lifted up to compress the elastic fitting 90 and to create below the lower end face of the piston 83 a passage through which the pumped machining fluid floods into the tubular electrode 64 via a fluid passage 93 centrally formed in the tool holder 75. A valve unit 94 (FIG. 1) is provided for adjustment of the pressure of the machining fluid pumped into the chamber 83 and its rate of flow through and out of the tubular electrode 64. The tool holder 75 as a whole is electrically conductive and its flange 77 is contacted by an electric brush 95 electrically connected to a contact 67b so that when the arm 66 is switched to engage the contact 67b, the brush 95 is connected to the electrode terminal of the electroerosion power supply 65 to energize the tubular electrode 64 (FIG. 1).

Referring to FIGS. 1 and 4, the assembly 70 further carries a pair of rollers 96 and 97 (e.g. composed of a ceramic) which accepts wire 3 leading downwards from the guide roller 24 on the head member 69. The roller 96 is normally fixed in position and held in engagement with wire 3 while the roller 97 is displaceable by an electromagnetic actuator 98 to engage and disengage with wire against the fixed roller 96. The roller 96 may be provided with a lever 99 to manually engage and disengage with the wire. Also included in the assembly 70 are a pair of grippers 101 and 102 which jointly operate to receive wire 3 extending from the rollers 96, 97 through a forwardly convergent wire guide 100 and to feed the wire into and through the tubular electrode 64. A heating coil 107 is disposed below the lower grip 102 and adjacent the wire and is energized by a power supply 108 to create localized heat, e.g. of a temperature of 600° C., sufficient for the wire stretched to break there. The grippers 101 and 102 have respective pairs of jaws or fingers 101a, 101b; and 102a, 102b which pairs are actuated by electromagnetic actuators 103 and 104, respectively, to grip and release wire 3. In the arrangement illustrated, the lower gripper 102 is vertically fixed in position while the upper gripper 101 is movable up and down by a further electromagnetic actuator 105. In operation, the upper gripper 101 is vertically reciprocated with a predetermined stroke d.

In each down and up cycle, the gripper 101 at its uppermost position is actuated by the actuator 103 to grip wire 3 and then actuated to move down by the actuator 105 while the gripper 102 is held releasing the wire 3. The gripper 101 is allowed to move down, gripping the wire, until it comes into contact with a touch sensor 106 disposed above the lower gripper 102 and spaced with the distance d below the initial position of the gripper 101. The touch sensor 106 defining a lowermost position of the gripper 101 then issues a signal which acts on the actuator 104 to allow the gripper 102 to grip the wire, on the actuator 103 to allow the gripper 101 to release the wire and then on the actuator 105 to allow the gripper 105 to move up and return to the initial position. The actuator 105 is set to move up the gripper 101 quickly and by the distance d and then to move down quickly after the actuator 104 deactuates the gripper 102 to release the wire. The cycle is repeated a predetermined number of times n to allow the wire 3 to be intermittently fed to advance by a total length nxd. In this mode of feed, a counter associated with the touch sensor 106 operates to count the contacts of the gripper 101 therewith and, when the number n of counts is reached, to act on the actuator 105 so that the gripper 101 is no longer moved down. The stroke d is, for example, 2 mm. The grippers 101 and 102 are actuated so that each may hold wire 3 at a gripping force of 10 to 20 kg and with a positioning accurary of ±0.05 mm. The gripping system 101–105 is operated to allow the wire to be advance at a rate of 5 to 15 m/min.

Now turning to the AT operation with the arrangement shown and described, it is noted that the wire to be threaded need be either "initially threaded" or "rethreaded".

In the former case it may be assumed that the free end of wire 3 from the supply reel 15 is set to lie between the lower gripper 102 and the tool holder 75 on the assembly 70. The wire from the supply reel 15 has been manually guided over the rollers 17a–17c and 18c, between the tension rollers 19 and 20, through the guide tube 22, over the guide rollers 18b, 18c and 24, between the rollers 96 and 97, through the guide opening 100, the open upper gripper 101, the opening of the contact sensor 106 and the open lower gripper 102. The roller 96 remains retracted away from the roller 97. The tubular electrode 64 has been or will then be set into the tool holder 75 manually or automatically with an AEC (automatic electrode changing) unit 110 to be described later. Also, the workpiece 4 has been or will then be set in place so that a start position of the programmed TW-electroerosion contour lies in alignment with the aforesaid straight-line path passing through the tubular electrode 64. In this connection, the head member 69 assumes a vertical position dependent on the thickness of the workpiece 4 so that the nozzle 61 of the upper housing 37 lies adjacent the upper surface of the workpiece 4. The assembly 70 lies at a vertical position such as to locate the forward end of the tubular electrode 64 away from or immediately above the housing 37.

The "rethreading" case assumes that a previous TW operation has been finished so that wire 3 remains extending along the established continuous path between the supply reel 15 and the collection box 32 through the tubular electrode 64 and the TW-machined workpiece 4. In this state, the roller 96 is again held remote from the roller 97, the grippers 101 and 102 remain in wire-releasing positions, and the wire from the tubular electrode 64 extends in contact with the pins 43 and 44 and the upper precision guide elements 52a and 52b in the upper housing 37, through the workpiece 4 (at the end of the TW-cut contour), and through the lower housing 38 over the roller 23 into the takeup assembly 26. The rethreading operation is initiated by breaking the wire upstream of the workpiece 4 in the aforesaid straight-line path. In the illustrated arrangement 3, the wire is thermally broken by the heating coil 107 and the coil 107 is temporarily energized by the power supply 108 to develop between the lower gripper 102 and the tool holder 75 localized heat sufficient to break the wire. The traction rollers 27 and 28 are then driven by the motor 33 to advance the forward broken wire portion through the tubular electrode 64, the upper housing 37, the workpiece 4, the lower housing 38 etc and eventually to discharge it into the collection box 32. The broken free end of the wire on the supply side now lies immediately above the tool holder 75. Thereafter, the workpiece 4 is reset, or a new workpiece 4 is it and set, in its horizontal (X-Y) position, to locate a programmed start position of the desired TW-electroerosion contour in alignment with the straight-line wire-threading path extending through the tubular electrode 64.

The subsequent essential steps of the AT operation here in both initial threading and rethreading situations then follow. The motors 16 and 21 and the grippers 101 and 102 are actuated. The motor 33 may not be driven. The motor 21 is driven to rotate the tension roller 19 in the clockwise sense as shown to allow the wire to slack and slightly hang down between the tubular guide 22 and the guide roller 18b. The motor 16 is actuated to allow the wire in the supply reel 15 to be dispensed under the traction caused by the traction rollers 19 and 20. The grippers 101 and 102 are repetitively actuated as mentioned to intermittently advance the wire by a length d in each advance stroke. Thus the free end portion of wire 3 is introduced through the tool holder 75 into the tubular electrode 64 clamped therein. As the end portion of the wire is so advanced along the straight-line path, the portion of wire between the tubular guide 22 and the guide roller 18b is pulled by the advancing wire and gradually rises until it comes into engagement with the contact sensor 23. The sensor 23 when contacted by the wire acts on the motor 21 to rotate the roller 19 clockwise to dispense the wire from the supply reel 15 beyond the tubular guide 22. Thus, the wire forward drive 19-21 is intermittently driven under the control of the contact sensor 22 to incrementally dispense wire from the supply reel 15, maintaining the dispensed wire relaxed upstream of the grippers 101, 102 and permitting the latter to smoothly advance the wire intermittently. The wire is introduced by the grippers 101, 102 into the tubular electrode 64 by a full length thereof, or by a given extent, preferably, such that when the tubular electrode 64 electroerosively penetrates the workpiece 4, as will be described, the end of wire 3 lies beyond or below the lower surface of the workpiece.

The wire 3 with a portion of its end so introduced into the tubular electrode 64 is then clamped to the assembly 70 or carriage 71 by means of one or both of the grippers 101 and 102 set into the wire-gripping state by the actuator(s) 103 and/or 104. In addition, the actuator 98 operates to bring the roller 96 into firm engagement with the fixed roller 97 with the wire clamped therebetween. The motor 74 is then driven in a servo-control mode to move the carriage 71 and hence the tubular electrode 64 downwards towards the workpiece 4 along the aforesaid straight-line path. The motors 16 and 21 remain active to continue to dispense wire from the supply reel 15 to follow up the wire advancing with the assembly 70. In the housing 37, the pins 51 and 53 are retracted away from each other by the actuator 54 so that they may not touch the tubular electrode 64. The guide elements 52a and 52b are also retracted by the actuators 55 and 56 but to a limited extent such that they slidably accept the tubular electrode 64 and guide its linear movement along the path. The pump 92 is actuated to supply the pressurized machining fluid (e.g. at a pressure of 60 Kg/cm$^2$ at the inlet site) through the tool holder 75 into the tubular electrode 64, permitting the fluid to flush out through the open end thereof. The pump 47 is also actuated to supply the machining fluid (e.g. of a pressure of 5 kg/cm$^2$ at the inlet site) onto the workpiece 4 through the nozzle 61. The valve 48 may remain closed. The arm 66 now may be or may have been set to engage the contact 67a to energize the tubular electrode 64 and the workpiece 4 from the EDM power supply 65. Thus, the tubular electrode 64 is advanced into the workpiece 4 by the servo-driven motor 42 while electroerosively removing stock from the workpiece to progressively form a bore 5 therein. The inlet opening 62, the passage 63 and the enlarged precision guide unit 52 effectively guide the movement of the tubular electrode 64 advancing into and through the workpiece 4 so as to prevent the electrode 64, which is elongate, from laterally deflecting.

The machining fluid continues to be flushed through and out of the tubular electrode 64 from the tool holder 75 into the workpiece 4 to serve as the electroerosion medium, flush away the machining detritus and cool the tubular electrode The machining fluid introduce into the housing 37 effectively cools the tubular electrode 64 and the guide unit 52 and also serves as a fluid bearing for the tubular electrode advancing therethrough. In addition, the nozzle 61 creates an annular flushing flow of the fluid about the tubular electrode 64 to enhance the flushing and cooling actions produced by the machining fluid flowing out of the tubular electrode in the machining zone. During the formation of the bore 5 in the workpiece 4, it has also been found desirable that the tubular electrode 64 be rapidly revolved about its axis, preferably by a given angle of rotation, e.g. 270°, alternately in the opposite directions. Such electrode revolution has been found to be desirable, coupled with the unique, dynamic flushing action described, to enhance the rate of bore formation on one hand and to prevent possible fusion of the wire on the tubular electrode 64 on the other hand. The tubular electrode 64 may start revolving after it comes adjacent, into or out of, the housing 37 so that its free end may not fluctuate while it is moving in free space i.e. before the free end is threaded into the housing 37.

In the electroerosive forming of the bore 5, it is sometimes desirable to employ machining conditions (e.g. higher peak current and shorter duration of the electrical pulses), which permit enhanced electrode wear to enhance the rate of stock removal, i.e. bore formation. In such cases, a substantial length of the tubular electrode 64 from its lower end will be eroded away, together with a corresponding length of the wire end portion carried therein (which length is substantially up to the level of the eroded tubular electrode) when the wire is originally set to extend through the tubular electrode 64 by a full length thereof. Then, the distance of the advance of the tubular electrode 64 through the workpiece 4 need be much greater than the thickness thereof. Thus, when the precise amount of erosive wear or reduction in length of the tubular electrode 64 is not exactly ascertainable in advance, it will be necessary to sense a breakthrough of the tubular electrode finishing the bore in the workpiece 4. Accordingly, in FIG. 1, a touch sensor 111 is shown disposed below the workpiece 4 and designed to be brought, by a hydraulic or pneumatic actuator 112, in the AT operation to a sensing position in alignment with the axis of the tubular electrode 64. The sensor 111 in the embodiment illustrated is also constructed to be supplied with the machining fluid by a pump 113 and to direct the machining fluid under pressure through an opening 114 towards an area of the workpiece 4 where the tubular electrode 64 emerges penetrating the workpiece 4 and thus finishing the bore 5 therein. It has been found that when the tubular electrode 64 just penetrates the workpiece 4, air tends to be entrapped in the machining gap so that erosive discharges may become unstable, thus deterring a complete breakthrough, deteriorating the quality of the bore formed and causing excess wear of the wire and its possible fusion onto the tubular electrode. Such problems have been found to be overcome by utilizing the auxiliary flow of the machining fluid trained into the bore-finishing area. A valve unit 115 is disposed between the pump 113 and the inlet port of the unit 111 to adjust the input pressure of the auxiliary machining fluid flow through the nozzle 114, e.g. at 7 kg/cm$^2$.

When the tubular electrode 64 penetrates the workpiece 4, thus finishing the bore therein, and comes in contact with the sensor 107, the latter acts through a control circuit (not shown) on the motor 74 to slightly lift up the tubular electrode 64 while leaving its end still located below the bore, i.e. below the lower surface of the workpiece 4. Although less desirable, the tubular electrode 64 may be retracted to place its lower end in the finished bore. Then the actuator 112 is operated to remove from ahead of the tubular electrode 64, and return to the standby position shown, the sensor unit 111 which has encumbered further passage of the wire electrode 3 beyond the end of the tubular electrode 64. The control circuit also acts to cut off the EDM power supply 65 and to deactuate the pump 113. Then, in the assembly 70 the motor 79 is stopped to cease revolving the tubular electrode 64. The actuator 98 is operated to retract the roller 96 to release the wire and the actuator 104 to cause the gripper 102 to release the wire. In the takeup side, the roller 27 is slightly lifted up by the actuator 36 to facilitate entry between the rollers 27 of the free end of the wire 3 which is forthcoming. The grippers 101 and 102 are operated as described before to incrementally advance the wire 3 through the tubular electrode 64 penetrating the workpiece 4. Thus, the free end of the wire 3 in the tubular electrode 64 near the end thereof is advanced through the nozzle 43 into the lower housing 38, through the lower precision wire-guide 44, the curved guide passage 45b over the roller 25 and through the guide opening 34 into between the rollers 27 and 28. At this stage, the tubular electrode 64 and the housing 37 continue to be pumped with the machining fluid to maintain flows through and around the tubular electrode 64 and around the wire to facilitate the threading of the end thereof through the nozzle 43 into the lower precision wire guide 44. The wire is advanced by the grippers 101 and 102 until its free end reaches, for example, the rollers 27 and 28. Thus, an electrical sensing circuit may be connected (e.g. between the rollers 25 and 28) such as to form a closed circuit through the wire when the end of the wire passes between the rollers 27 and 28 to develop a signal which acts on the actuators 103–105 to bring the grippers 101 and 102 into the wire-releasing states and return the gripper 102 to the original uppermost or standby position and at the same time to operate the actuator 36 to bring the roller 27 into engagement with the roller 28 and the motor 33 so that the wire is further advanced by the traction rollers 27 and 28 to move through the guide opening 35 and the guide tube 29 and eventually between the discharge rollers 30, 31 for collection in the box 32.

In a modification of the operation described, the wire when threaded through the tool holder 75 may be introduced into the tubular electrode 64 only to a limited extent so as to minimize its erosion in spite of some erosion of the tubular electrode 64. In this case, the end of wire (erosion-resultant or without undergoing erosion) when the tubular electrode 64 penetrates the workpiece 4 and reaches its lowermost position beyond the lower opening of the bore 5 may lie in the tubular electrode 64 at a vertical level below the lower surface, between the upper and lower surfaces or above the upper surface of the workpiece 4 depending on the thickness thereof. The wire is then advanced through the tubular electrode 64 as described by the grippers 101 and 102 to displace its end towards the takeup unit 26. In a further modification, the heater coil 107 or cutter to break the wire 3 after a previous TW operation may be located between the lower end of the tubular electrode 64 and the workpiece 4, e.g. above the housing 37. In this case, the wire has already been introduced through the tubular electrode 64 when the breaking takes place and no "rethreading" of the wire therethrough by the grippers 101 and 102 is required. Irrespective of the precise position of the end of the wire at which the grippers 101 and 102 start advancing the wire 3 after the bore 5 is finished, they continue advancing the wire automatically until the wire becomes continuous in the established path as described.

The takeup rollers 27 and 28 may continue to be driven by the motor 33 to transport continuous wire 3 from the supply reel 15 into the collection box 32. The pump 92 is deactuated to cease supplying the machining fluid into the tubular electrode 64. The motor 74 is operated to return the assembly 70 and the tubular electrode 64 to the standby position as shown. The valve 48 is opened and the pump 47 remains actuated. The arm 66 is brought to engage the contact 67a and the power supply 65 is actuated to permit a TW operation to commence to electroerosively cut the workpiece 4 starting with the bore now threaded with the continuous wire 3. On the board 13a carrying the tension unit, the motor 21 has been switched to controlledly rotate the tension roller 19 in the counterclockwise sense as shown so that the rollers 19 and 20 now act as the wire-braking means to give the wire 3 a sufficient tension and to allow it to continue to travel in alignment with the straight-line path between the rollers 24 and 25 under the strong traction exerted by the traction rollers 27 and 28. The contact sensor 23 detects a slightest loosening of the wire between horizontal wire-guide 22 and the roller 18b to incrementally drive the motor 21 so as to maintain the braking action to the wire in the continuous path. The TW-electroerosion in the workpiece 4 proceeds under the commands of the NC unit 68 along the programmed path from the starting bore until the final programmed position is reached.

Figure 5:
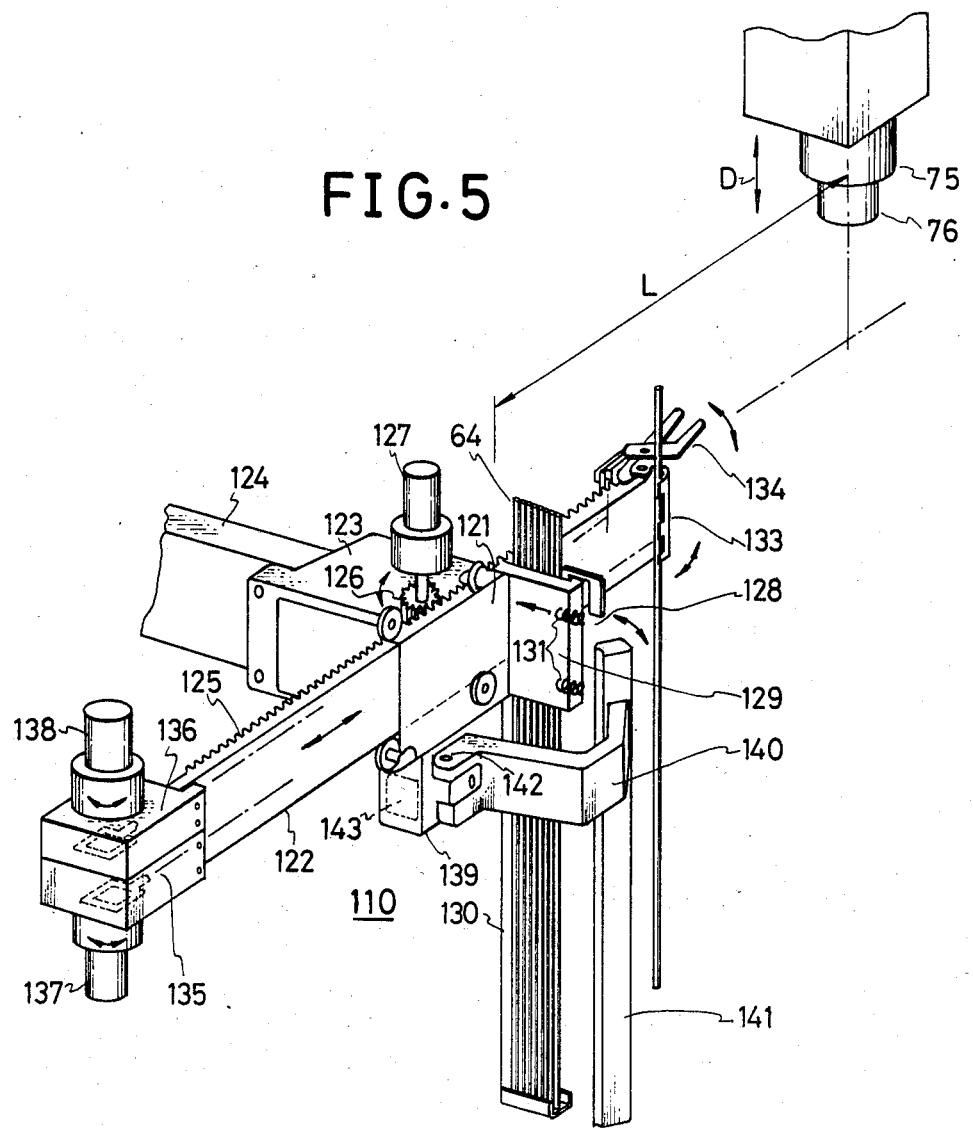
FIG. 5 is a schematic perspective view of an AEC assembly shown in FIG. 1.
Figure 6:
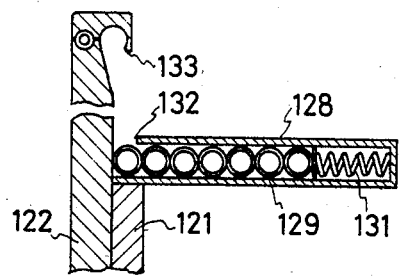
FIG. 6 is a schematic cross-sectional view of a portion of the assembly in FIG. 5.

The machine shown also includes the AEC unit 110 which enables the tubular electrode 64, which erodes and is reduced in length after a number of TW operations, to be replaced automatically by one of a number of stored fresh electrodes. The AEC unit 110 is shown in FIG. 1 as supported by the head member 69. Referring to FIG. 5, the unit 110 includes a bracket 121 which carries a slider 122 which is horizontally movable therethrough. The bracket 111 is secured to a base 123 which is in turn secured to the head member 69 by means of a horizontal arm 124 which extends transversely to the slider 122. The slider 122 has a rack 125 in mesh with a pinion 126 which is rotatable by a DC motor 127 carried on the base 123 to move the slider 122. The bracket 121 carries a magazine 128 having a multiplicity of vertical tubular electrodes 64, e.g. thirty in number, stored in a row in a frame 129 thereof as shown in FIG. 6. The electrodes 64 may be composed, e.g., of copper. The magazine 128 also has an L-shaped downward extension 130 to support the lower ends of the tubular electrodes 64 thereon. A spring 131 is inserted in the frame 129 to urge the row of tubular electrodes 64 against the slider 122 and retain them in position within the frame 129. The frame 129 has an opening 132 adjacent the slider 122 to admit the tubular electrodes 64 to be urged out one by one and accepted by a jaw or gripper 133 disposed at the forward end of the slider 122. A further gripper 134 is also shown mounted on the slider 122 towards that end and operates to assume a function to be described. The slider 122, which is hollow, carries two parallel crank mechanisms 135 and 136 therein and carries at its rear end DC motors 137 and 138 which are driven to actuate the grippers 133 and 134 via the crank mechanisms 135 and 136, respectively. The gripper 133 is shown as holding one tubular electrode 64 admitted from the magazine 128 and transferring it to the tool holder 75. A further bracket 139 is also secured to the base 123 and carries a swivel arm 140 which at its end supports an elongate casing 141 for accepting consumed tubular electrodes from the tool holder 75. The arm 140 is pivoted on a vertical pin 142 and swung by an electromagnetic actuator 143 in the bracket 140 to bring the casing 141 into and out of its electrode accepting position.

In operation, the motor 127 is driven to advance the slider 122 by a given distance to bring the gripper 133 into engagement with a consumed tubular electrode loosely held by the fluidic clamp as mentioned in the tool holder 75. The actuator 137, 135 is operated to allow the gripper 133 to firmly grasp the consumed tubular electrode and the motor 74 (FIG. 1) is then driven to raise the assembly 70 and hence the tool holder 75 by a distance D to allow the consumed tubular electrode to be released from the chuck 76 of the tool holder 75 and transferred to the gripper 133. The slider 122 is then retracted by the motor 127 to position the gripper 133 above the casing 141. The gripper 133 is then unclamped by the actuator 137, 135 to release the consumed tubular electrode and allow it to drop into the casing 141. The arm 140 is then swung by the actuator 143 to bring the casing 141 out of the path of a fresh tubular electrode 64 to be transferred by the gripper 133 from the magazine 128. The slider 122 continues to be retracted until the gripper 133 returns to the magazine 128 where it captures the one of the stored tubular electrodes 64 which is adjacent the slider 122. The slider 122 then advances by a distance L to bring the captured tubular electrode 64 below the tool holder 75. The arm 140 may now been swung back to return the casing 141 to the original position. The motor 74 (FIG. 1) is then operated to descend the assembly 70 and hence the tool holder 75 to allow the tubular electrode 64 to be inserted into the chuck 76 and clamped thereby. The actuator 137, 135 then operates the gripper 133 to release the clamped tubular electrode 64. Thereupon, the slider 122 returns to the original standby position.

The gripper 134 is used to capture and throw away a wire fragment which may be entrapped in a tubular electrode 64 in an AT or TW operation. For example, an AT operation might happen to fail in bringing the end of wire 3 into the takeup unit 27 so that a "re-try" AT operation may be necessary. In such a case, the gripper 134 carried on the slider 122 below the tool holder 75 is operated by the actuator 138, 136 to grip the wire after the tubular electrode 64 is removed from the chuck 76 by the gripper 133. The heater coil 107 is then energized by the power supply 108 to break the wire 3 above the tool holder. The slider 122 is thence retracted by the motor 127 to allow the gripper 134 to pull out the resultant wire extending into the tool holder 75 and the tubular electrode 64. The gripper 134 is thence released to throw it away.

In case a failure in the AT operation is not completely avoidable, the machine shown also has a capability of monitoring such a failure in the threading path. Thus, the free end of wire 3 might be caught somewhere in the path so as to disable any further threading advance thereof along the path in spite of the continued operation of the wire-advancing means 101-105. The counter 116 associated with the touch sensor 106 provides a signal which represents a commanded distance of advance of wire 3. An electric sensing circuit 117 is shown connected across the contact 67b and the conductive roller 25 so that when the free end of wire 3 comes in contact with the roller 25, the circuit 117 develops an electric signal A1. The counter 116 is designed to issue an electric signal A2 when its count reaches a predetermined level which represents the length of wire 3 which the grippers 101, 102 must dispense until after connected to the counter 116 and the sensing circuit 117 and, in response to the signal A1 before receiving the singal A2, indicates a success in wire threading throughout the straight-line path upstream of the roller 25. The logic circuit 118 when it fails to receive the signal A1 and receives the signal A2 issues a failure signal which serves to deactuate the grippers 101, 102 and return the assembly 70 to the original position. In addition or alternatively, the gripper 101 may have a pressure-sensitive element incorporated therein which is designed to provide through a sensing circuit thereof an output signal which represents the magnitude of load that the gripper 101 undergoes in advancing wire 3. Should wire tend to be caught, the magnitude of load will increase. Thus a deviation in magnitude of the sensed signal will occur and can derive a control signal which may be used to cease the threading operation and have the system "retry".

It has been found that the chance of a "catch" of the wire end during and after the electroerosive forming of the bore through the workpiece 4 by the tubular electrode 64 is minimized by axially reciprocating with an amplitude of 0.5 to 5 mm the wire while moving it (and within) the electroeroding tubular electrode and when it moves out of the electrode after the electroerosive bore formation. To this end, in the arrangement illustrated the gripper 101 may be driven by the actuator 105 to reciprocate while gripping the wire rapidly or at a moderate rate in each cycle of the wire advance described. The effect of the wire reciprocating with the tubular is particularly noticeable when the electrode is just penetrating the workpiece where the machining discharges tend to become unstable, apparently adversely affecting the wire end located near the electrode end. To overcome the machining instabilization and the consequent possible catching of the wire end in the tubular electrode 64 penetrating the workpiece 4, it has also be found to be advantageous if the electrical parameters of the erosive discharges are altered to develop a machining condition which allows the electrode 64 (and possibly also the wire) to undergo greater erosion. The electrode polarity may be altered to make the workpiece 4 cathodic. Alternatively or in addition, the peak current of the discharge pulses may be increased and the pulse duration of the discharge pulses may be reduced. In this case, as mentioned previously an auxiliary flow of the machining fluid (e.g. deionized water) is directed under pressure onto the area of the lower surface of the workpiece 4 where the end of the tubular electrode 64 emerges finishing the bore.

Figure 7:
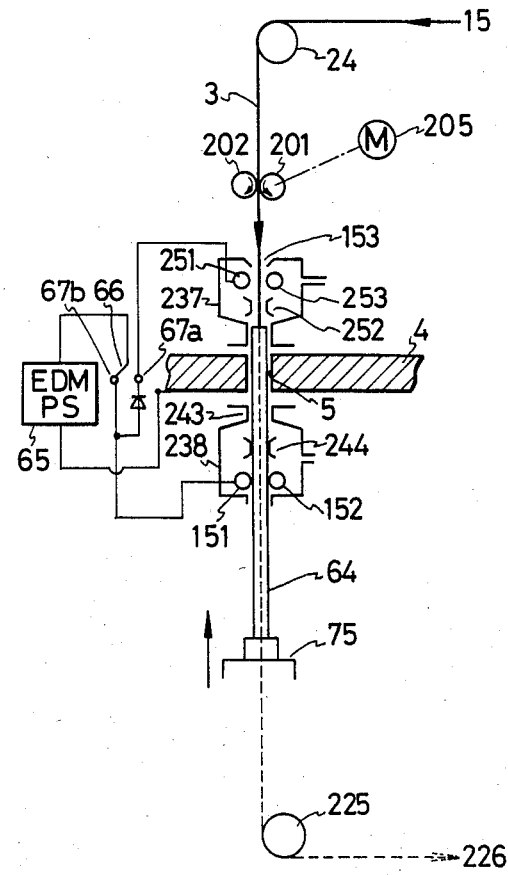
FIGS. 7(A) and 7(B) are a schematic views, essentially in elevation and partly in section, illustrating another form of the TW machine arrangement according to the present invention.
Figure 7:
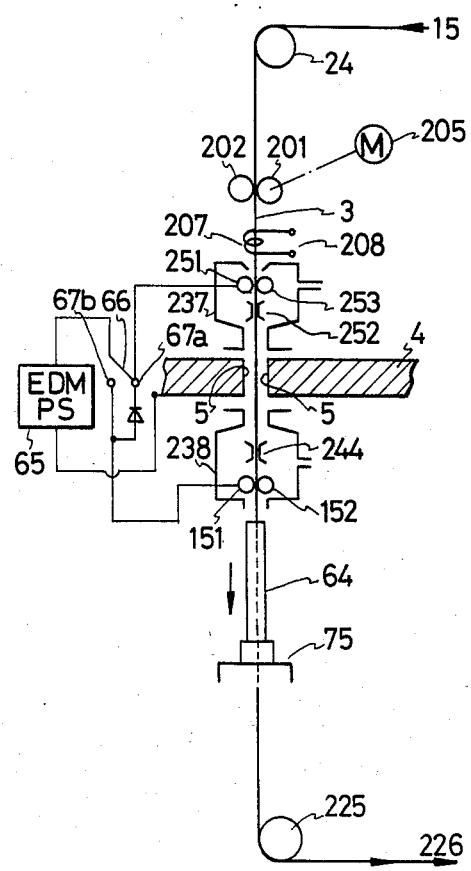

In a further modified arrangement of the machine according to the present invention as shown in FIG. 7(A) and 7(B), the tubular electrode 64 is supported by the tool holder 75 at the side of a workpiece 4, lower as shown, which is opposite to the side, upper as shown, in which wire 3 is introduced into the tubular electrode 64. In FIG. 7(A) the tubular electrode 64 supported through a lower housing 238 is shown as having electroerosively penetrated the workpiece 4 and thus finished a bore 5 therein. In the electroerosive machining of the bore, a lower precision guide unit 244 is enlarged at its guide opening to slidably accept the tubular electrode 64 in the housing 238. Therein a wire-energizing pin 151 and a wire-holding pin 152 are repositioned also to guide the movement of the tubular electrode 64. The pin 151 is also connected to the EDM power supply 65 to energize the tubular electrode 64. The housing 238 is here again pumped with the machining fluid to direct it through the nozzle 243 into the cutting zone and produce an annular flow thereof about the tubular electrode and surrounding the flow of the machining fluid flushed out of the tubular electrode 64. When the tubular electrode 64 reaches an uppermost position of the bore 5 and stops there, the free end of wire 3 extending from the supply reel 15 over the upper guide roller 24 lies immediately above the inlet opening of an upper housing 237 and is supported by a pair of rollers 201 and 202 urged together. The rollers are rotated by a motor 205 to advance the wire into a narrow, downwardly convergent guide opening 153, between a wire-energizing pin 251 and a wire-holding pin 253 which are retracted to enlarge the space therebetween into a wire-threading size, and an upper precision wire guide 252 which is also enlarged of its guide opening, and then into the tubular electrode 64 through its upper end opening. The housing 237 is supplied with the machining fluid to cause a high-speed stream thereof surrounding the wire to facilitate its threading into the tubular electrode 64. The motor 205 continues to advance wire 3 through the tubular electrode 64 and over the lower guide roller 225 until its end reaches a wire takeup means 226. The tubular electrode 64 is then retracted downwards to its standby position. The elements 151 152, 251, 253, 244 and 252 are brought each into engagement with the wire 3 now extending along the straight-line path between the guide rollers 224 and 225 to establish a state shown in FIG. 7(B), thus completing the AT operation, to enable a TW operation to be initiated. At the end of the TW operation, the heating coil 207 is energized by the power supply 208 to break the wire 3 above the housing.

Figure 8:
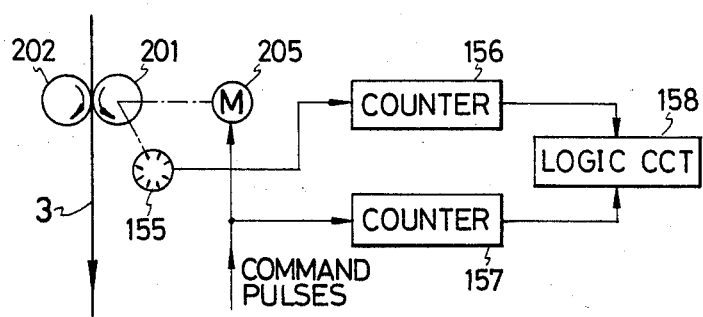
FIG. 8 is a schematic circuit diagram illustrating means for monitoring advance of wire to detect a possible catch thereof in a threading path.

In the embodiment of FIGS. 7(A) and 7(B) as well, a "catch" of the free end of wire 3, if it happens, somewhere in the threading path can be detected. A sensing arrangement shown in FIG. 8 makes use of the fact that when the wire end is caught, there develops a change in the torque of the motor 205 driving the rollers 201 and 202 which advances wire 3. The motor 205 is driven by command pulses whose number represents a length of wire to be advanced. An encoder 155 is associated with the shaft of the roller 201 to sense the rotation thereof and produce pulses at a rate which is proportional to the rate of rotation. A counter 156 is provided to count the pulses produced by the encoder 205. A further counter 157 is provided 1 to count the pulses being furnished to the motor 205. As long as wire 3 is advancing, the counters 156 and 157 coincide in their count levels. When, however, the end of wire is caught somewhere in the path, a torque encountered by the motor 205 and the roller 201 increases, resulting in a reduction in the rate of pulses produced by the encoder 155 and counted by the counter 156. A logic circuit 158 is connected to the counters 156 and 157 and, when a disagreement occurs between the count levels thereof, issues an alarm signal which may serve to stop the motor 205 and to energize the heater 207 to break the wire above the housing 237, thus enabling the system to reinitiate the threading operation.

While the invention has been described herein with reference to certain preferred embodiments thereof, it will be understood that various alterations and modifications can be made therein without departing from the spirit of the present invention which is defined in the claims which follows.

What is claimed is:

1. A method of threading electrode wire through a conductive workpiece in a traveling-wire electroerosion machine having a cutting zone established in a predetermined continuous path of wire travel between a wire supply means and a wire takeup means, the method comprising the steps of:
   (a) positioning a tubular electroerosion electrode axially in alignment substantially with a straight-line wire-threading path extending across a cutting zone in a continuous path;
   (b) introducing wire from a supply means into the tubular electroerosion electrode at a wire inlet side of said cutting zone;
   (c) positioning the workpiece to locate a start position of traveling-wire electroerosion therein substantially in alignment with said straight-line path in said cutting zone;
   (d) axially advancing the tubular electrode substantially along said wire-threading path into and through the workpiece while electroeroding the workpiece to form a bore penetrating the workpiece between said wire-inlet side and a wire-outlet side of said cutting zone at said start position;
   (e) retracting the tubular electroerosion electrode substantially along said straight-line path from said workpiece while leaving wire at least partially in said bore finished in the workpiece; and (f) dispensing electrode wire from said supply means to allow wire to move out of the tubular electrode while at least partially in said bore, into said wire outlet side towards said takeup means in said continuous path.

2. The method defined in claim 1 wherein step (d) comprises (d') advancing the tubular electrode while maintaining wire introduced in step (b) at least partially therein.

3. The method defined in claim 2 wherein wire is maintained in the tubular electrode and advanced therewith in step (d').

4. The method defined in claim 3, further comprising the step of, prior to step (d'), clamping wire in a fixed relationship with the tubular electrode to enable the wire to advance therewith in step (d').

5. The method defined in claim 3 wherein wire is so maintained that its end lies near the end of the tubular electrode substantially throughout step (d') and the wire end reaches beyond the bore at the end of step (d'), followed by steps (e) and (f).

6. The method defined in claim 3 wherein in step (d') the tubular electrode and wire both undergo erosion and wire is maintained to maintain its eroding end near the eroding end of the tubular electrode so that the eroded end of wire reaches beyond the finish bore at the end of step (d'), followed by steps (e) and (f).

7. The method defined in claim 3 wherein the tubular electrode undergoes erosion during step (d) and wire is electroerosively erodible and wherein wire is introduced in step (b) to such an extent that its end without undergoing substantial erosion lies beyond the finished bore at the end of step (d'), followed by steps (e) and (f).

8. The method defined in claim 2 wherein the tubular electrode undergoes erosion during step (d) and the end of said wire introduced in step (b) is so maintained within the tubular electrode throughout step (d') that it does not substantially suffer erosion in spite of erosion of the latter, followed by steps (e) and (f).

9. The method defined in claim 4 wherein wire is maintained in, and advanced, with the tubular electrode until it reaches beyond the finished bore at the end of step (d'), followed by steps (e) and (f).

10. The method defined in claim 2 wherein wire is so maintained in the advancing tubular electrode in step (d') that its end remains out of the finished bore when the tubular electrode penetrates the workpiece, followed by steps (e) and (f).

11. The method defined in claim 2 wherein wire is so maintained in the advancing tubular electrode in step (d') that its end lies in the finished bore when the tubular electrode penetrates the workpiece, followed by steps (e) and (f).

12. The method defined in claim 5, claim 6, claim 7, claim 8, claim 9, claim 10 or claim 11 wherein step (f) at least partially precedes step (e).

13. The method defined in claim 12 wherein step (f) is continued at least until the end of wire reaches said takeup means prior to step (e).

14. The method defined in claim 12 wherein a machining fluid is flushed about wire through the tubular electrode into the bore being formed in step (d') and, after the bore is finished, is continued to be flushed about the wire to facilitate entry of its end from the electrode end into a narrow passage towards said takeup means.

15. The method defined in claim 14, further comprising the step of, in step (d'), directing an auxiliary flow of the machining fluid from said wire-outlet side at least onto an area of the workpiece where the tubular electrode is coming out while finishing said bore.

16. The method defined in claim 15, further comprising the step of, in step (d'), of axially reciprocating wire at least in a time period in which the tubular electrode is so coming out.

17. The method defined in claim 15, further comprising the step of, in step (d'), of establishing electroeroding conditions, at least in a time period in which the tubular electrode is so coming out, such as to permit it to erosively wear quickly.

18. The method defined in claim 14 wherein in step (d') the tubular electrode is advanced into the workpiece through housing means while being guided against lateral deflection by guide means therein, further comprising the step of supplying a machining fluid into said housing means to establish a flow of the machining fluid therein surrounding said tubular electrode penetrating into the workpiece.

19. The method defined in claim 14, further comprising the step of, in step (d'), cyclically revolving the tubular electrode by an angle of rotation alternately in opposite rotary directions.

20. The method defined in claim 12 wherein in step (f), said wire from the supply means is incrementally dispensed into, through and out of the tubular electrode along said straight-line path towards said takeup means until a prescribed number of incremental advances is reached.

21. The method defined in claim 12, further comprising the step of, in step (f), sensing arrival of the end of wire at a predetermined position downstream of the workpiece in said straight-line path to ascertain a success of threading.

22. The method defined in claim 12, further comprising the step of, in step (f), sensing arrival of the end of wire at said takeup means to ascertain a success of threading.

23. The method defined in claim 12, further comprising the step of, in step (d'), sensing arrival of the end of the tubular electrode at a predetermined position beyond the workpiece in said straight-line path prior to step (f).

24. The method defined in claim 14, further comprising the step of, subsequent to step (d') and prior to step (f), temporarily retracting the tubular electrode while leaving its end beyond the finished bore.

25. The method defined in claim 1 wherein the tubular electrode is supported at said wire-outlet side and advanced into said wire inlet side through the workpiece while forming said bore therein in step (d) and wire is thereafter introduced at said inlet side into the tubular electrode in step (b) and dispensed in step (f), followed by step (e).

26. The method defined in claim 25 wherein in step (d) a machining fluid is flushed through the tubular electrode into the bore being formed in the workpiece and the tubular electrode is advanced into the workpiece through housing means while being guided against lateral deflection by guide means, further comprising the step of supplying the machining fluid into said housing means to establish a flow of the machining fluid therein surrounding said tubular electrode penetrating into the workpiece.

27. The method defined in claim 25 wherein said wire is introduced in step (b) into the tubular electrode through guide means in further housing means at said wire-inlet side, further comprising the steps of directing an auxiliary flow of the machining fluid at least onto an area of the workpiece where the tubular electrode emerges into said wire-inlet side in step (d) and continuing such an auxiliary flow about wire in said further housing means to facilitate entry of the end of wire into said tubular electrode in step (b).

28. The method defined in claim 1 or claim 25, further comprising the step of monitoring the end of wire dispensed in step (f) to detect a possible catch thereof somewhere in said straight line path.

29. The method defined in claim 1 or claim 25, further comprising the step of sensing an instantaneous position of wire dispensed in step (f) to detect a possible catch thereof somewhere in said continuous path between a site of the introduction of wire in step (b) and said takeup means.

30. The method defined in claim 1 wherein wire is introduced in step (b) by breaking, at a position between tubular electrode and workpiece, wire extending through the tubular electrode and the latter along said continuous path between said supply and takeup means prior to step (c).

31. A traveling-wire electroerosion machine with an automatic wire-threading function, having a wire-supply means, a wire-takeup means and a cutting zone established in a predetermined continuous path of wire travel between them, and a straight-line wire-threading path extending across the cutting zone in said continuous path, the machine comprising:
  means for supporting a conductive workpiece so that an established start position therein of traveling-wire electroerosion lies substantially in alignment with a straight-line wire threading path
  a tool holder for accepting a tubular electroerosion electrode and supporting it substantially in axial alignment with said straight-line sire-threading path while permitting the tubular electrode to accommodate therein an electrode wire extending through said tool holder;
  guide means for introducing wire dispensed from supply means, into said tubular electrode at a wire-inlet side of a cutting zone;
  drive means associated with said said tool holder for axially advancing the tubular electrode substantially along said straight-line wire-threading path into and through the workpiece while electroeroding the workpiece to form a bore penetrating the workpiece between said wire-inlet side and a wire-outlet side of said cutting zone, and thereafter retracting the tubular electrode from the work-piece while leaving wire at least partially in said bore finished therein; and
  wire-dispensing means operable in conjunction with said drive means for dispensing wire from said supply means to axially drive wire introduced to move out of said tubular electrode while the latter remains at least partially in the finished bore, into said wire-outlet side towards said takeup means in said continuous path.

32. The machine defined in claim 31 wherein said tool holder lies at said wire-inlet side and has an inlet guide opening associated therewith constituting at least a portion of said guide means for accepting said wire from supply means.

33. The machine defined in claim 32, further comprising housing means having a guide passage for guiding movement of the tubular electrode against lateral deflection, said guide passage being formed by a plurality of guide components displaceable to reduce said guide opening to a size sufficient to guide movement of wire during the TW electroerosion.

34. The machine defined in claim 33 wherein said tool holder has a fluid passage for supplying machining fluid under pressure into, and flushing it about wire, through the tubular electrode into said bore being formed in the workpiece.

35. The machine defined in claim 34 wherein said tool holder has a fluid inlet for accepting a pressure fluid therein to firmly clamp the tubular electrode therein.

36. The machine defined in claim 34 wherein said housing means has an inner fluid passage for supply with a machining fluid to establish a flow thereof in contact with said guide components and an outlet nozzle forming an annular passage about the tubular electrode for directing the flow therethrough in the direction of the workpiece to cooperate with the machining fluid flushing out of the tubular electrode in the electroerosive formation of said bore.

37. The machine defined in claim 36, further comprising means for revolving the tubular electrode about its axis substantially in alignment with said wire-threading path while advancing through said housing means and in contact with the machining fluid therein.

38. The machine defined in claim 32, further comprising means connected to said tool holder for supplying a machining fluid under pressure through the tubular electrode into the bore being formed in the workpiece; means connected to said tool holder for revolving the tubular electrode about its axis substantially in alignment with said straight-line path; housing means having a plurality of guide passages spaced apart from each other along said straight-line path therein for guiding movement of the tubular electrode against lateral deflection, an fluid outlet, fluid passages and a fluid inlet for supply with a pressurized machining fluid to establish a flow thereof in contact with the revolving tubular electrode in the fluid passages and to direct the flow through the outlet in the direction of the workpiece to cooperate with a flow of the machining fluid flushing out of the revolving electrode in electroeroding said bore in the workpiece.

39. The machine defined in claim 38 wherein said means for revolving is adapted to cyclically revolve the tubular electrode by a predetermined angle of rotation alternately in opposite rotary directions.

40. The machine defined in claim 38 wherein said guide passage includes an inlet opening of said housing means for the tubular electrode prior to advancing into the workpiece.

41. The machine defined in claim 40 wherein said housing means has a wire-energizing member and a wire-supporting member which are displaceable in a set so as to be brought into engagement with wire for TW electroerosion of the workpiece and to be removed away from said straight-line path when the tubular electrode is advancing through the housing means into the workpiece and precision wire-guide means reducible of its guide spacing for guiding movement of wire during TW electroerosion and enlargeable of its guide spacing for guiding movement of the tubular electrode when the bore is being formed thereby in the workpiece.

42. The machine defined in claim 41 wherein said guide passages include at least one of a spacing formed by said wire-energizing member and wire-supporting member when removed away and the enlarged spacing in said precision wire-guide means.

43. The machine defined in claim 41 wherein said set of the wire-energizing and wire-supporting members and said precision wire-guide means are accommodated in separate compartments, respectively, in said housing means and said guide passages include an guide opening disposed between said compartments.

44. The machine defined in claim 34, claim 36 or claim 38, further comprising means operable at least for a time period in which the tubular electrode advanced into the workpiece is penetrating it into said wire-outlet side for directing an auxiliary flow of the machining fluid at least onto an area of the workpiece where the tubular electrode is coming out in the wire-outlet side.

45. The machine defined in claim 44 wherein said means for directing includes means for sensing a finishing of said bore through the workpiece.

46. The machine defined in claim 45 wherein said means for sensing comprises a contact sensor adapted to be contacted by the end of the advancing tubular electrode emerging from the finished bore for providing an electric signal serving to halt the tubular electrode through said drive means.

47. The machine defined in claim 31 wherein said drive means includes gripper means operable for incrementally dispensing wire through the tubular electrode and towards said takeup means along said continuous path.

48. The machine defined in claim 46 wherein said gripper means includes a first and second gripper a first actuator for operating the first gripper to grip and release wire, a second actuator for operating the second gripper to grip and release wire and a third actuator for operating the first gripper to reciprocate with a predetermined stroke equal to a distance between predetermined first and second positions along said straight line path, the first gripper being operable while gripping wire to move from said first position to said second position while the second gripper releases wire to dispense wire along said straight-line path by a length equal to said distance in one half of each cycle of reciprocation, the first gripper being operable while releasing wire to move from the second position to first position while the second gripper grips said wire in the other half of each cycle of reciprocation, and means for commanding the first, second and third actuators to operate to repeat cycle by a predetermined number to allow said wire to advance by a distance being substantially equal to product of said length and said number.

49. The machine defined in claim 47, further comprising means for clamping wire in a fixed relationship with the tool holder so that wire is moved with the tubular electrode therein while the latter is advancing into the workpiece.

50. The machine defined in claim 49 wherein said clamping means is at least in part constituted by said gripper means.

51. The machine defined in claim 31, further comprising means for sensing arrival of the end of wire at an end of said straight-line path beyond the workpiece.

52. The machine defined in claim 31, further comprising means for sensing arrival of the end of wire at said takeup means.

53. The machine defined in claim 31, further comprising means for monitoring advance of the end of wire along said straight-line path to detect a catching thereof in said straight-line path.

54. The machine defined in claim 31 wherein said tool holder lies in said wire outlet side and has an inlet guide opening associated therewith constituting at least a portion of said guide means for accepting wire from said supply means through the end of the tubular electrode penetrating the workpiece.

* * * * *